United States Patent [19]

Neff

[11] Patent Number: 5,496,208

[45] Date of Patent: Mar. 5, 1996

[54] GRINDING WHEEL

[76] Inventor: Charles E. Neff, 406 Ripple Creek, Houston, Tex. 77024

[21] Appl. No.: 487,570

[22] Filed: Jun. 7, 1995

Related U.S. Application Data

[63] Continuation of Ser. No. 62,562, May 17, 1993, abandoned, which is a continuation-in-part of Ser. No. 952,682, Sep. 24, 1992, which is a division of Ser. No. 453,684, Dec. 20, 1989, Pat. No. 5,181,939.

[51] Int. Cl.$^6$ .................................................. B23F 21/03
[52] U.S. Cl. .......................... 451/541; 451/540; 29/76.1
[58] Field of Search ..................... 51/206 R, 206 NF, 51/206 P, 209 R, 206.4, 206.5, 209 DL, 204; 451/540, 541, 542, 547, 548, 550, 551; 29/76.1, 76.2, 76.3, 76.4, 77

[56] References Cited

U.S. PATENT DOCUMENTS

| | | | |
|---|---|---|---|
| 2,205,939 | 6/1940 | Wilson | 29/76.1 |
| 2,820,746 | 1/1958 | Keeleric | 451/548 |
| 2,906,612 | 9/1959 | Anthony et al. | 451/548 |
| 3,898,772 | 8/1975 | Sawluk | 51/206 P |
| 4,977,709 | 12/1990 | Siden | 51/206 NF |

*Primary Examiner*—Bruce M. Kisliuk
*Assistant Examiner*—Eileen P. Morgan
*Attorney, Agent, or Firm*—Leydig, Voit & Mayer, Ltd.

[57] ABSTRACT

A radially extending surface having an annular portion coated with abrasive elements which are arranged with respect to one another into a pattern having a first axis which is substantially oriented in the direction of relative motion between the pattern and a workpiece and a second axis disposed orthogonal to said first axis providing a substantially radially extending path for radial elimination of chips from the grinding operation. The annular portion may be broken into sectors which each offer an individual pattern. The first axis of each pattern of each sector is ideally an offset centered arrangement of elements and the second axis is ideally an aligned centered arrangement of elements. In this manner a texture is presented to the workpiece in a broad spectrum of orientations which provide for maximum material removal and maximum surface finish of the workpiece.

6 Claims, 3 Drawing Sheets

| DEGREES | PROFILE |
|---|---|
| 30<br>90 | /\/\/\ |
| 0<br>60 | /\/\/\/\ |
| 10<br>50<br>70 | /\/\/\/\/\ |

GRINDING WHEEL

This is a continuation of application Ser. No. 08/062,562, filed May 17, 1993, now abandoned which is a continuation in part of Ser. No. 952,682, filed Sep. 24, 1992 which is a divisional of Ser. No. 453,648, filed Dec. 20, 1989, now U.S. Pat. No. 5,181,939.

FIELD OF THE INVENTION

This invention relates to grinding wheels and, more particularly, to grinding wheels including abrasive elements oriented in a predetermined pattern so as to maximize grinding efficiency.

DESCRIPTION OF THE RELATED ART

Considering all other factors such as tool durability, heating and the like in initial tool selection, optimum life and highest speeds and feeds in a grinding operation are realized by using a grinding wheel having the maximum coarseness texture available; whereas, optimum workpiece surface finish is realized by using the minimum coarseness grinding wheel texture. In most grinding operations it is necessary to remove extra workpiece material to achieve a final workpiece dimension in addition to workpiece material which must be removed to produce a smooth surface finish. Therefore, there is a necessity to use multiple grinding wheels and/or multiple grinding operations to achieve the totality of grinding objectives. Consequently, the cost of a grinding operation is increased due to the necessity to provide multiple wheels, and or multiple grinding operations, to satisfy the various grinding objectives. The object of the present invention is to provide a single grinding wheel which achieves both high material removal rates and smooth surface finishes.

In addition, typical grinding wheels present a multitude of abrasive elements to a workpiece which are arranged in a random pattern. An optimum finish is produced by using a grinding wheel in which the abrasive elements are arranged so as to maximize the number of abrasive elements which carve individual paths through the workpiece per unit revolution of the grinding wheel. Therefore, if abrasive elements are arranged in a random pattern a substantial probability exists that abrasive elements will travel a path in which subsequent elements will follow one another through the workpiece failing to achieve the above objective. In addition, it has been found that a random orientation of abrasive elements complicates and consequentially impedes the flow of debris away from the point at which it is formed; whereas, a debris flow path which may be established by using a predetermined pattern of abrasive elements will ease elimination of debris from the location at which they are generated thereby preventing the debris from being smeared back into the workpiece surface. The object of the present invention is to provide a grinding wheel having well defined debris flow paths for elimination of debris from the locus of generation.

Finally, grinding wheels used to produce a predetermined profile must be dressed to that profile prior to installation in a grinding operation. Preparing a grinding wheel in this manner is costly as a dressing operation is required which takes time and utilizes expensive profile dressing wheels. The abrasive coating of the present invention features abrasive elements having a working surface defined by a plurality of pinnacled structures. An object of the present invention is to provide a grinding wheel with an abrasive coating comprising a plurality of pinnacled structures which define a working surface having the ultimate profile sought to be ground and such a surface requires no or minimal dressing and may be referred to as NET-SHAPE. In this manner more efficient grinding may be realized as minimal or none of the abrasive coating is removed to achieve the desired profile. Additionally, if the abrasive points or pinnacles presented by the abrasive elements are formed and define an outward peripheral working surface which matches the ultimate profile, they are preserved because no dressing is required. The pinnacles thereof need not be touched.

SUMMARY OF THE PRESENT INVENTION

One embodiment of the present invention includes a grinding wheel having a central axis of rotation and featuring a radially extending surface having an annular portion coated with abrasive elements which are arranged into a predetermined pattern with respect to one another. The pattern is oriented relative to a first axis which is in substantial alignment with the direction of relative motion between individual elements of the pattern and a workpiece and a second axis orthogonally disposed relative to said first axis whereby appropriate orientation of individual elements relative thereto provide a generally radially extending path for elimination of debris from the grinding operation. Each abrasive element features a pinnacled structure having a centermost protruding portion. The annular portion of the grinding wheel may be broken into sectors which each offer an individual pattern which may differ from one another for selective purposes. Such a pattern, defined on a sector, is presented to the workpiece in a sweeping manner resulting in a broad range of orientations of the pattern with respect to the workpiece thereby accomplishing maximum material removal and maximum surface finish smoothness along the first axis while providing an open path for elimination of debris along the second axis.

In addition, the abrasive elements of the present invention feature elemental structures which are substantially identical in all dimensional properties; including having a predetermined height. In this manner an abrasive or high friction surface may be provided having a NET-SHAPE dimension requiring minimal or no dressing for use in grinding a predetermined profile in a workpiece.

These and other aspects of the present invention will become more readily apparent by reference to the following detailed description of the embodiments as shown in the drawings.

DETAILED DESCRIPTION OF THE PREFERRED EMBODIMENT

Figure 1:
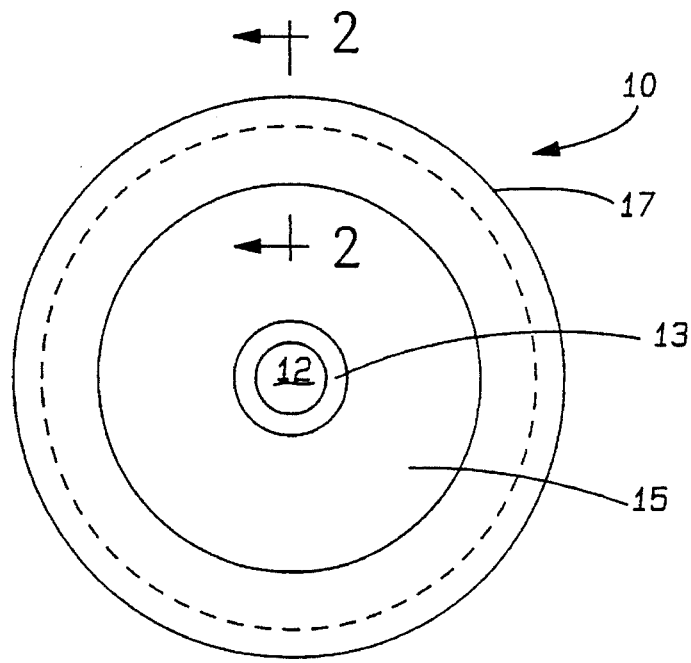
FIG. 1 is a plan view of the grinding wheel of the present invention.
Figure 2:
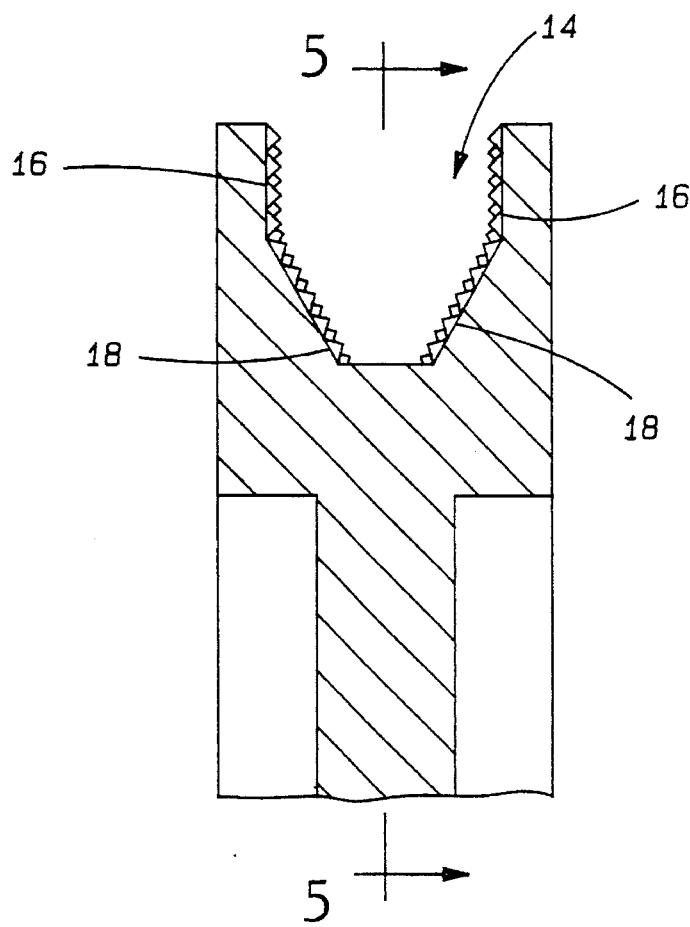
FIG. 2 is a section view of a portion of the grinding wheel of the present invention taken on the line 2—2 of FIG. 1.
Figures 3, 4:
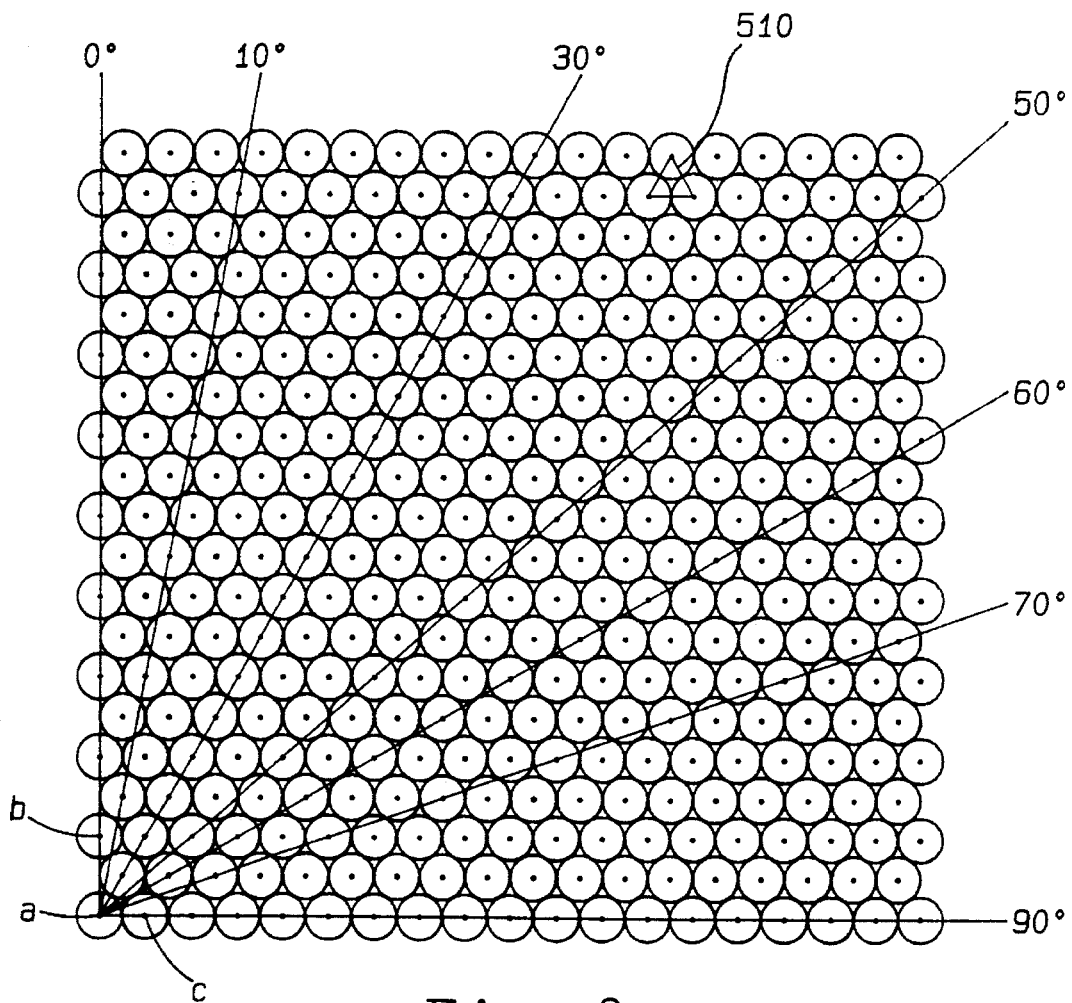
FIG. 3 is a plan view of the abrasive elements arranged in a pattern for use in the present invention.
FIG. 4 is a side view of a pattern of the abrasive elements viewed from various orientations.

The present invention, as shown in FIG. 1, comprises a wheel 10 including a bore 12, a hub 13, a web 15 and a working flange 17. Flange 17 has a concave axially extending cylindrical recess 14 with an annular flat 16, 16 and an angled portion 18, 18 (as shown in FIG. 2). The profile of the vertical flat 16 and angled portion 18 are defined by the finished profile to which the workpiece is to be ground taking into consideration the elasticity, or spring back properties thereof. Such a wheel may be advantageously used to grind a predetermined profile in a belt made of rubber or other materials for use in automotive accessory drives. The abrasive elements used on the grinding wheel of the present invention are preferably arranged in plan view as shown in FIG. 3 into a compact collection of triangles 510. The orientation of abrasive elements into a repetitive pattern of triangle 510 maximizes the abrasive element concentration for a given element height and shape. Such a pattern features an off-set centered arrangement which repeats from different perspectives, for example, when viewed in the 0 and 60 degree orientation and an aligned-centered arrangement which repeats in the 30 and 90 degree orientations.

Maximum material removal will be achieved by moving a pattern of abrasive elements as shown with respect to a workpiece along the 30 or 90 degree axes; however, such will produce a coarse textured workpiece surface. The next highest material removal rate will be achieved by moving a pattern of abrasive elements as shown with respect to a workpiece along the 0 or 60 degree axis; resulting in a moderately coarse textured workpiece surface. A reduced material removal rate will be achieved by moving a pattern of abrasive elements as shown with respect to a workpiece along either of the 10.0, 50.0 or 70.0 degree axes; however such a configuration results in a relatively smooth finish. Further improvements in finish for particular applications may be achieved by slight variations in orientation of the pattern about these axes; up to about 5 degrees.

Figure 5:
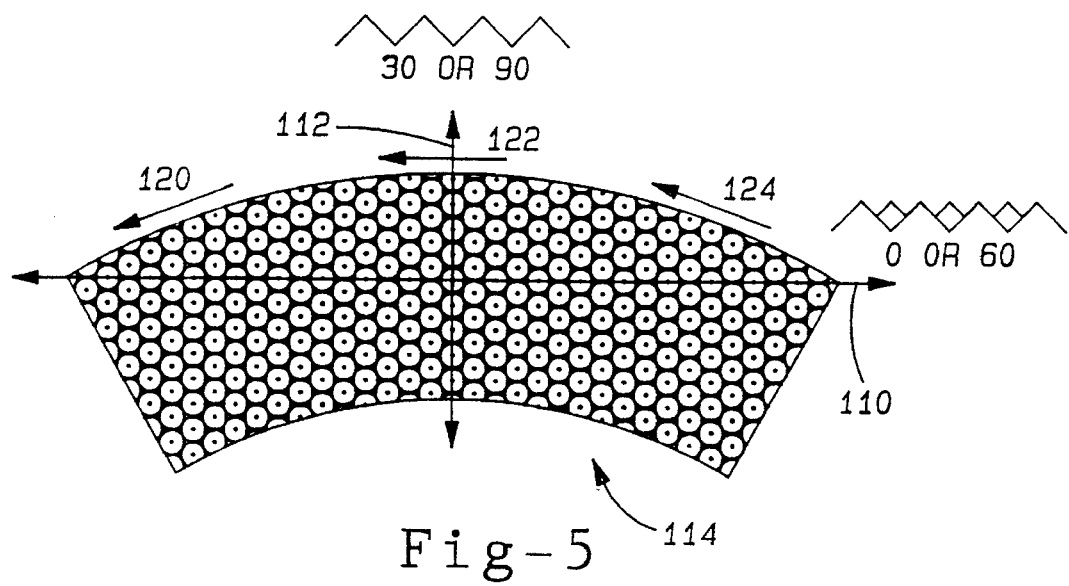
FIG. 5 is a plan view of a pattern of abrasive elements formed as a sector for covering a radially extending annular portion of a grinding wheel.
Figure 6:
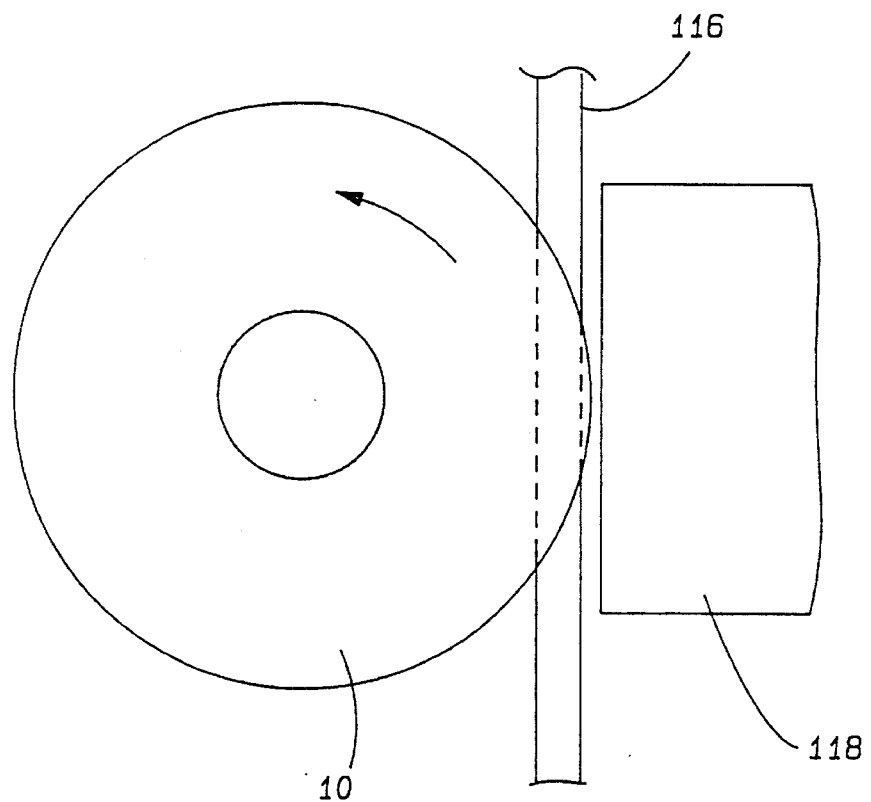
FIG. 6 is a grinding wheel of the present invention shown engaging a work piece.

An ideal grinding operation will present all of the aforementioned axes to a workpiece, thereby accomplishing maximum material removal and maximum surface smoothness. Such may be realized by application of patterns of abrasive elements of the present invention to vertical and angled surfaces 16, 18 as multiple sectors according to the orientation illustrated in FIG. 5. Such sectors present discrete orientations of first axis 110 and second axis 112. It has been determined by experimentation that limiting the sectors to an angular width of 30 degrees produces optimal results. Thus, the entire working surface of the vertical or radial flat 16 and angled face 18 of grinding wheel 10 is covered by 12 sectors. As shown in FIG. 5, sector 114 extends between two end radials which form an acute angle at the wheel axis of rotation. In this manner free flow of debris is achieved in a radial direction which is substantially parallel with second axis 112 by the alignment of abrasive elements into parallel rows each being displaced from one another by one elemental unit. First axis 110 disposed orthogonal therewith presents aligned abrasive elements forming rows which are displaced from one another by a dimension equal to one half the elemental dimension thereof. Sector 114 will travel in a rotary path whereas a workpiece 116 as shown in FIG. 6 will be maintained in a fixed relation backed by an anvil 118 presenting a flat or arced grinding reaction surface. In this manner sector 114 passes over the surface of a workpiece such as workpiece 116 and presents a variety of orientations of the abrasive element pattern beginning with orientation illustrated by arrow 120 which is, for example, a 30° orientation. Thus as is apparent from the relationship of FIGS. 5 and 6 as the second or radial axis 112 is engaging the workpiece the first axis 110 will be aligned with and generally parallel to the tangent of the arc of rotation as the elements along the second axis 112 engaged the workpiece. Thus a coarse, high material removal texture is presented at the beginning of each sector. Then as sector 114 rotates relative to the workpiece, less aggressive material removal rate orientations of the pattern of abrasive elements are presented to the workpiece providing a smooth surface finish.

While a particular pattern configuration based on equilateral triangular placement has benefits of simplicity and efficiency, the invention is not to be limited thereto. Using the preferred design, a workpiece will be exposed to all orientations of a moving textured surface. In this manner a sweeping action is provided which results in a variety of texture characteristics illustrated in FIG. 4 being presented to the workpiece with the objective of accomplishing a variety of corresponding grinding performance objectives beginning with maximum material removal rate and including maximum surface finish smoothness. In addition, such a pattern defines radially extending chip flow paths along the 90 degree axis which facilitates elimination of debris produced during the grinding operation. Those paths exist throughout the circumference of the working surface and in the preferred embodiment, but are optimized where the elements are aligned with the second axis.

The preferred embodiment of the present invention incorporates abrasive elements which feature a pinnacled structure and have identical dimensional properties including a predetermined height. As a result, an abrasive or high friction surface may be provided in NET-SHAPE that is manufactured to require minimal or no dressing for optimum use in grinding a predetermined profile in a workpiece. Elimination of the dressing operation assures preservation of the pinnacle formed during the process described for producing an article having a high friction surface. The concept of the present invention may be utilized on any radially extending surface which may be rotated about an axis thereof with respect to a workpiece.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through Which the invention has advanced the art are properly considered within the spirit and scope of the invention.

I claim:

1. A grinding wheel having an axis of rotation and a radially extending face concentric with said rotational axis, said radially extending face having a plurality of sectors, the improvement comprising:

a plurality of discrete abrasive elements disposed on each of said sectors, each of said elements being generally the same in size and shape and having a central axis, the central axes of the elements of each of said sectors being aligned in generally parallel rows with the spacing between elements within a row being substantially uniform and the spacing between adjacent elements in one row being substantially the same as the spacing between adjacent elements in other rows, said sector having two ends defined by two radials, wherein said two radials form an acute angle at the axis of rotation of said wheel.

2. The grinding wheel of claim 1 wherein said radially extending face is generally normal to the wheel axis.

3. The grinding wheel of claim 1 wherein said radially extending face is a frustoconic face.

4. The grinding wheel of claim 1 wherein the central axis of an abrasive element in one row disposed on a sector is aligned with two corresponding abrasive elements in an adjacent row on said sector whereby lines drawn between said three central axes define an equilateral triangle.

5. The grinding wheel of claim 1 wherein said wheel has a peripheral radially extending groove therein, said groove defining two radially extending faces, each having a plurality of sectors, each of said sectors having a plurality of abrasive elements disposed as claimed.

6. The grinding wheel each claim 1 wherein of of said rows of elements on each of said sectors that is centrally disposed on the sector is generally radially extending on said face.

* * * * *